United States Patent [19]
McFerrin et al.

[11] Patent Number: 6,065,954
[45] Date of Patent: May 23, 2000

[54] WAX INJECTOR

[75] Inventors: Michael A. McFerrin; Joe Lynn Stickland; Grady Allen Wilcox, all of Dallas, Tex.

[73] Assignee: McFerrin Engineering & Manufacturing Co., Dallas, Tex.

[21] Appl. No.: 08/956,159

[22] Filed: Oct. 22, 1997

[51] Int. Cl.⁷ .................................................. B29C 45/77
[52] U.S. Cl. ........................... 425/144; 425/145; 425/149
[58] Field of Search ................................. 425/549, 144, 425/145, 149, 150

[56] References Cited

U.S. PATENT DOCUMENTS

| | | |
|---|---|---|
| 2,602,189 | 7/1952 | Finelt . |
| 3,055,055 | 9/1962 | Cook et al. . |
| 3,267,517 | 8/1966 | Altermatt . |
| 4,185,952 | 1/1980 | Hewitt . |
| 4,256,444 | 3/1981 | Suter . |
| 4,274,823 | 6/1981 | Stanciu et al. . |
| 4,521,172 | 6/1985 | Gilbert . |
| 4,655,700 | 4/1987 | Ahmed . |
| 4,875,845 | 10/1989 | Hara et al. . |
| 5,275,545 | 1/1994 | Ohyanagi . |
| 5,370,522 | 12/1994 | Linder . |
| 5,425,906 | 6/1995 | Hashimoto . |
| 5,447,425 | 9/1995 | Hsu et al. . |

*Primary Examiner*—Tim Heitbrink
*Attorney, Agent, or Firm*—Strasburger & Price, LLP

[57] ABSTRACT

A wax injector is used to create the wax mold for use in the investment casting process. The injector utilizes a wax pot to melt and store the molten wax to be injected. A heat exchanger heats the molten wax to its proper injection temperature just prior to injection. A pressure sensor senses when the mold is full of molten wax and shuts the wax valve to ensure proper wax metering. The injector also uses an improved mold clamp to secure and uniformly compress the two halves of the mold. The compressive force is applied via a pneumatically-operated piston attached to the clamp. An internal position sensor measures mold thickness and compression. The mold clamp is enclosed in an air-tight chamber that is evacuated before wax is injected into the mold.

10 Claims, 6 Drawing Sheets

WAX INJECTOR

TECHNICAL FIELD OF THE INVENTION

The present invention relates to a wax injector used to inject wax into molds. The wax injector melts the wax, evacuates air from within and around the mold, and injects the molten wax into the mold.

BACKGROUND OF THE INVENTION

Investment casting is the preferred casting method for producing jewelry, dental appliances and other intricate cast products. During investment casting of jewelry, for example, an original metal ring is produced. This metal model is then used to produce a rubber mold. Typically, several layers of rubber are laid down both below and above the model. The rubber is then pressed and vulcanized, creating a cavity around the model. When the model is removed, the cavity remains.

A wax pattern is then formed by injecting wax into the cavity in the rubber mold. Once the mold is filled, the wax is allowed to cool and then the mold is opened to reveal a wax pattern identical to the original ring. To mass produce jewelry, a number of such wax patterns are produced. Each wax pattern is then attached to a central wax stem, creating a tree. This tree is then placed into a flask—typically a metal cylinder with a plurality of holes in its side walls. A sleeve is placed around the flask and "investment"—a powdered substance, similar to plaster mixed with water—is poured around the wax tree. The flask is then subjected to vibration and vacuum to eliminate any air pockets between the investment and the tree.

Next, the flask is heated. When heated, the wax melts and the investment hardens. It is common to produce the stem from a wax with a lower melting point than the wax patterns. Consequently, when heated, the stem melts first, creating a central drain for the wax patterns. After the wax has drained, the hardened investment is a mold capable of producing a set of precious metal rings. To cast gold rings, gold is poured into the investment mold—under vacuum or centrifugal force to force the air out of the mold—and allowed to harden. The mold is then broken open, revealing a gold tree with numerous gold rings attached. The rings are then trimmed from the tree and polished, and the gold stem melted to salvage its gold for later use.

The quality of the precious metal ring depends on the quality of the wax pattern created from the original metal model. Therefore, it is important to control the variables affecting the filling of the rubber mold with wax. One variable is the amount of air in the mold. FIGS. 1a and 1b illustrate a typical mold 10. The mold 10 is essentially two slabs—10a and 10b—of interlocking rubber. The mold can be opened along split 12. Passage 14 leads from a nozzle engagement portion 16 to the ring cavity 18. The cavity 18 has two prongs: 18a and 18b. One prior art method of evacuating air involves applying a vacuum to the stem 14. However, air tends to leak through the side splits 12.

Slits 20 lead from cavity 18 to the sides of the mold. When the wax is injected into the mold, any air remaining in the mold can be forced out through the slits 20. However, the slits also facilitate leakage into the mold when a vacuum is applied. Failure to completely evacuate air from the mold will result in incomplete filling and a useless wax pattern.

When wax is injected into the mold, the pressure tends to force apart the two mold halves. To prevent this, the mold is clamped. However, overclamping will distort the cavity and underclamping will result in "finning" of the wax pattern. Thus, the correct clamping force must be precisely calculated and applied.

Wax quality and temperature also affect proper filling. Prior art wax injectors maintain the wax in a liquid state prior to injection. However, if the wax temperature is too high, the wax can decompose and separate; if too low, the wax can solidify prematurely. If the wax is solid, the valve can be destroyed. Therefore, a need exists for a wax injector that ensures the wax temperature is sufficiently high for injection and yet not high enough to damage the wax.

Air bubbles entrained in the molten wax can ruin the wax patterns. Prior art wax injectors use a single nozzle to inject the wax and to apply the vacuum. In other words, the mold engages the nozzle and a vacuum. A valve then couples the nozzle to a wax reservoir for injection. When the operator switches the nozzle from evacuation to injection mode, air can become entrained in the wax and make the wax pattern unusable.

A final source of wax pattern defects is entrained water vapor. Air—usually obtained from the shop compressed air system—pressurizes the wax pot. This high-pressure air usually contains considerable moisture that combines with the hot liquid wax. Upon injection, the water vapor may depressurize and expand in the wax pattern, ruining the pattern. Thus, a need exists for a wax injector that reduces or eliminates the water entrained in the wax.

SUMMARY OF THE INVENTION

A wax injector is disclosed which overcomes many of the disadvantages found in the prior art. One improvement is the creation of a vacuum within and around the mold prior to wax injection. The Wilcox clamp has a vacuum chamber to completely enclose the mold and provides an air-tight environment around the mold, mold clamp and nozzle. The entire chamber is evacuated and maintained at a vacuum until the injection process is complete. Consequently, air cannot leak into the mold prior to injection. Further, by using a chamber around the mold, separate connections can be used for wax injection and chamber evacuation, eliminating the air bubbles entrained in the molten wax when a single nozzle is switched from evacuation to injection mode. Finally, multiple clamp assemblies can be used, allowing wax injection to proceed in one clamp while others cool.

A second advantage of this improved wax injector is its precise wax temperature control. Incorporating an efficient, high surface-to-volume ratio heat exchanger improves the long-term quality of the wax. A main wax pot contains the wax to be injected. A heater melts some of the wax such that the pot contains a mixture of molten and solid wax. Keeping the wax at a relatively low temperature prevents separation and evaporation of volatile wax components. A wax valve directs molten wax to a nozzle/heat exchanger. The heat exchanger then quickly heats the wax to its injection temperature immediately prior to injection. A temperature sensor measures injection temperature. The higher injection temperature causes the wax to become more fluid at higher temperatures and fills the mold more completely. Additionally, because the wax is at its higher injection temperature for only a short time, the higher temperature will not separate the wax. Finally, the heat exchanger's high surface-to-volume ratio produces a rapid wax temperature change without exceeding the maximum allowable temperature.

Third, the present invention substantially reduces the amount of entrained water vapor in the wax. Instead of normal high-pressure shop air, this improved injector uses dry air to provide the injection pressure. A pressure detector in the wax pot measures the injection pressure.

The wax injector also incorporates a pressure sensor just upstream of the injection nozzle to detect when the mold is full. When the pressure sensor detects a pressure corresponding to a full mold, the injection computer shuts the wax valve. This stops the wax flow, preventing over- and under-fills, wax leakage, and resulting mess. The automatic shut-off also provides accurate injection timing data used to compute the necessary cooling interval before the clamp is released.

Securely clamping the mold—without distorting it—is crucial when producing the wax patterns. Rubber molds frequently do not have parallel faces. As a result, many mold clamps over-compress the thick end and under-compress the thin end. To solve this problem, the improved clamp utilizes a pivoting upper compression plate to provide uniform compression along the length of the mold. Uniform compression prevents mold distortion due to non-uniform mold thickness. To prevent overclamping, an internal position sensor measures mold thickness and compression, sending this data to the injection computer.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1A:
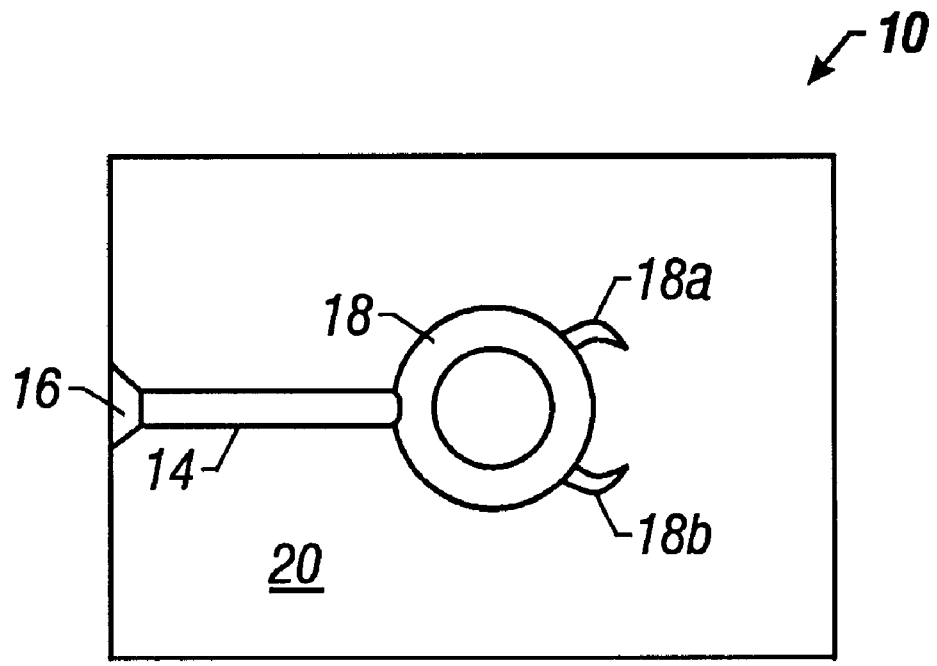
FIGS. 1a and 1b illustrate a prior art mold for wax injection.
Figure 1B:
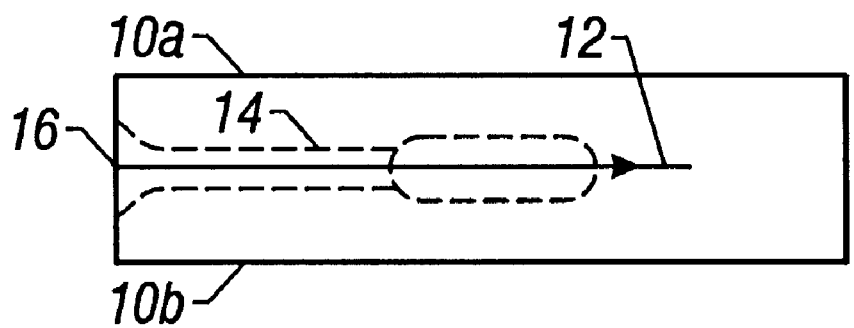
Figure 2:
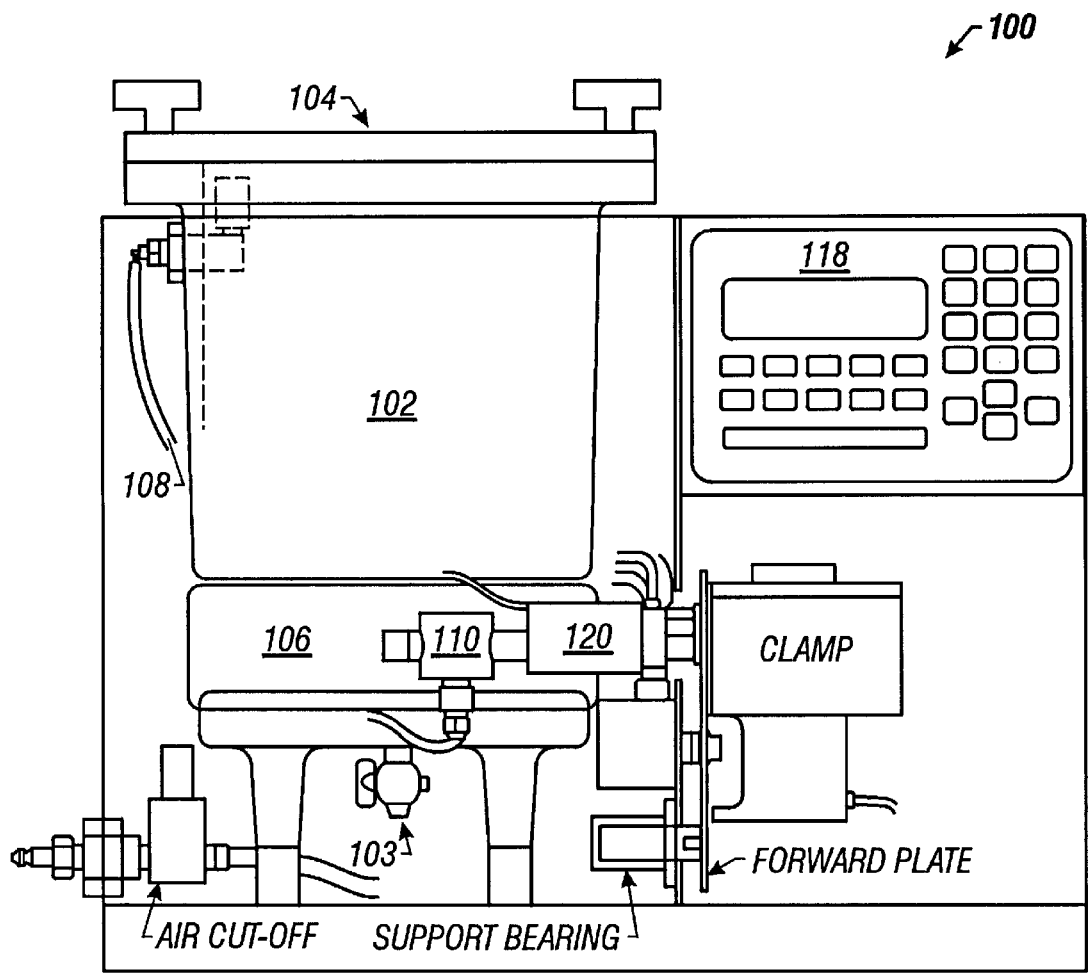
FIG. 2 illustrates the entire wax injection/clamp assembly system, including the wax pot, heat exchanger, and control panel.

The present invention is a wax injector that overcomes many of the disadvantages found in the prior art. Many manufacturers have developed molds such as the one illustrated in FIGS. 1a and 1b. The wax injection/clamp assembly shown in FIG. 2 provides significantly improved performance in the filling of such molds. Injector 100 accepts solid wax into a wax pot 102. Lid 104 secures the pot and wax drains through valve 103. Band heater 106 heats the wax to a liquid state and maintains its temperature just above the melting point to avoid any unnecessary loss of volatile components.

Figure 3:
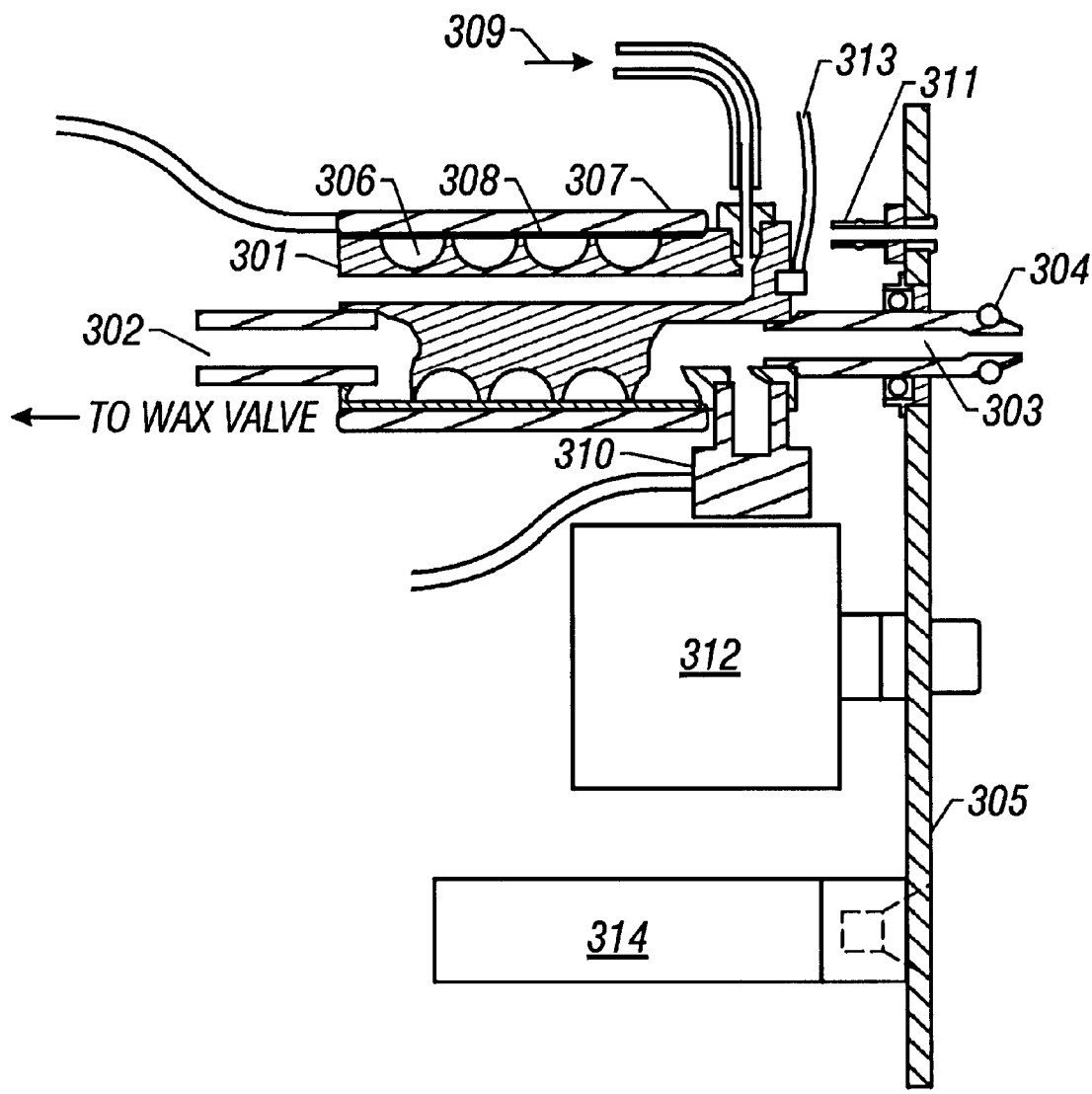
FIG. 3 illustrates the vacuum wax injection assembly.

The differential pressure between wax pot 102 and chamber 400 (discussed below) drives the wax into mold 10. Because chamber 400 is at a vacuum, wax pot 102 may be at ambient pressure, at a slight vacuum, or pressurized. Vacuum is drawn in the wax pot through connection 108; alternatively, connection 108 supplies the wax pot with dry, high-pressure air that pressurizes the wax pot and drives the wax through the system. Using desiccated air prevents water vapor entrainment in the wax. When opened, the wax valve 110 directs hot wax into the vacuum wax injection assembly 120, which is detailed in FIG. 3.

The molten wax enters the vacuum wax injection assembly through passage 302 and is heated to injection temperature by heat exchanger 301. This raises the wax temperature high enough to ensure that the wax does not prematurely freeze during the injection phase. In the heat exchanger, the wax flows through a helical groove 306 and is heated to injection temperature by a cylindrical heating element 307. Sleeve 308 separates the hot wax from the heater element. Hose 309 introduces cooling air into the heat exchanger to control temperature. Temperature sensor 313 relays temperature data to the injection computer 118. Finally, the wax is injected into the mold 10 through injector nozzle 303. Nozzle seal 304 seals the nozzle against the mold.

Pressure sensor 310 senses the rapid increase in wax fluid pressure corresponding to a full mold. The pressure sensor sends pressure data to the injection computer. When the pressure sensor detects a pressure corresponding to a full mold, the computer shuts the wax valve, preventing overflow.

Figure 4:
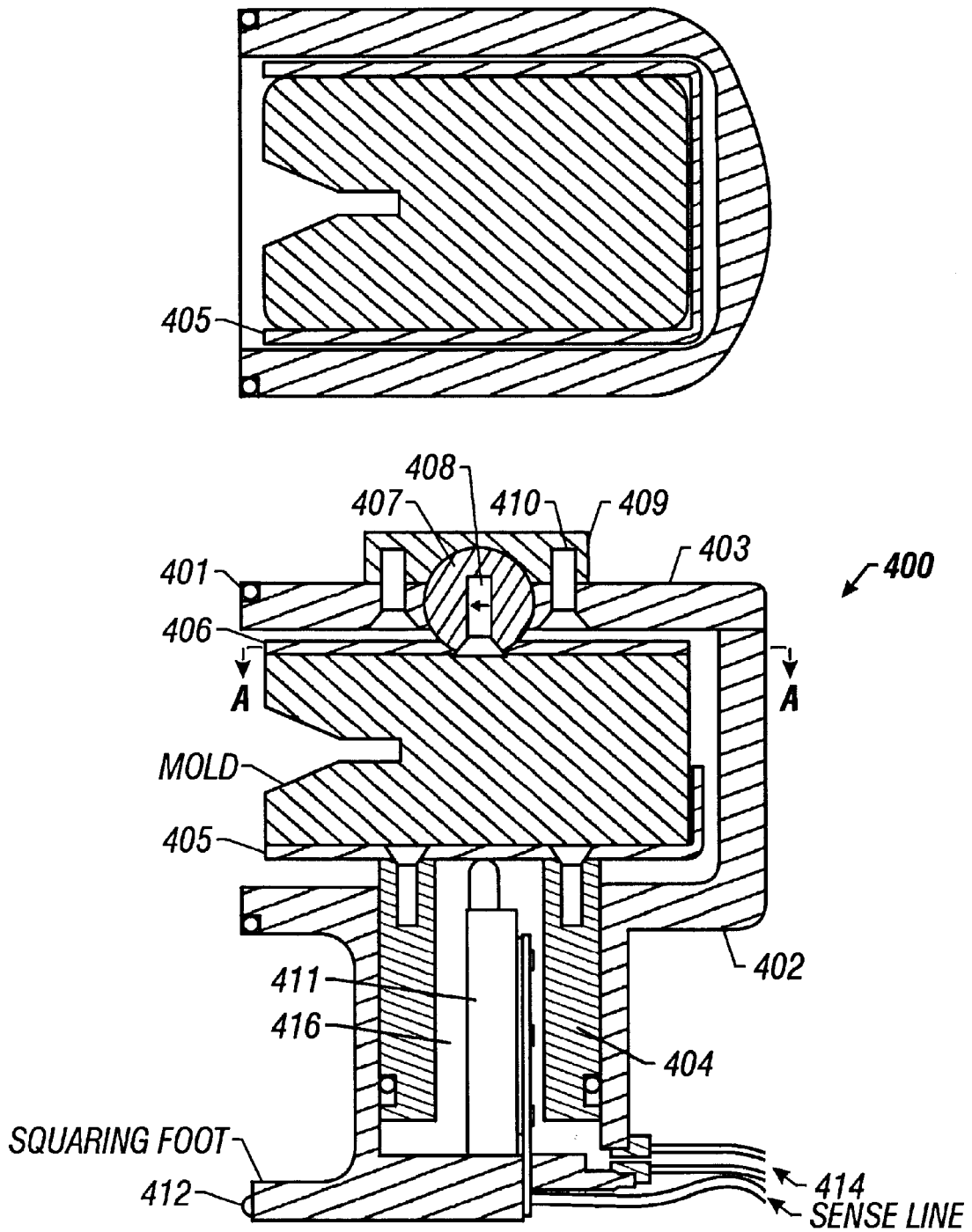
FIG. 4 illustrates the mold clamp/vacuum chamber assembly.
Figure 4A:
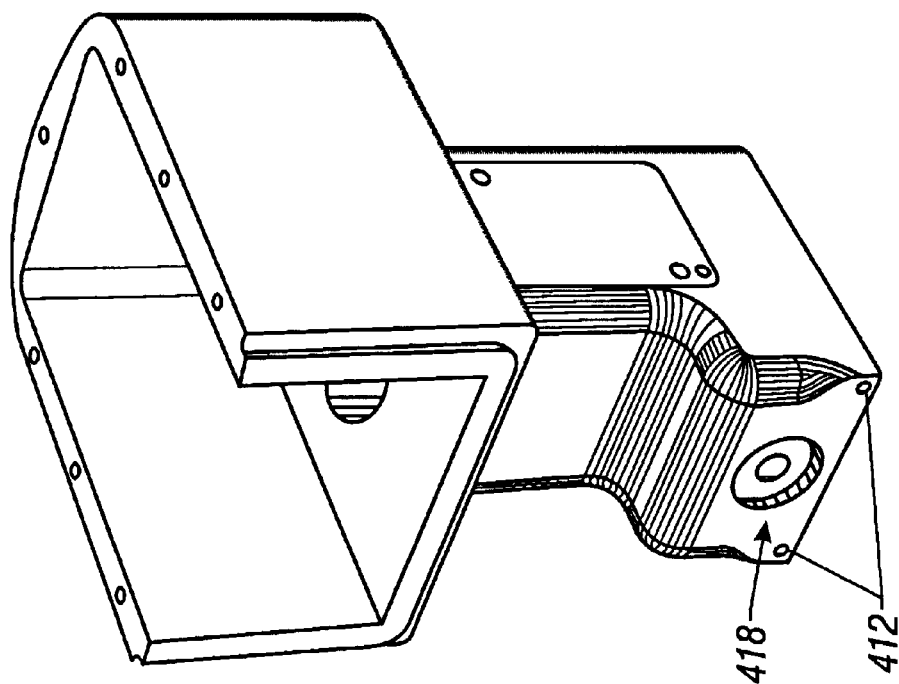
FIG. 4a illustrates the vacuum chamber without its top or the clamp.
Figure 6:
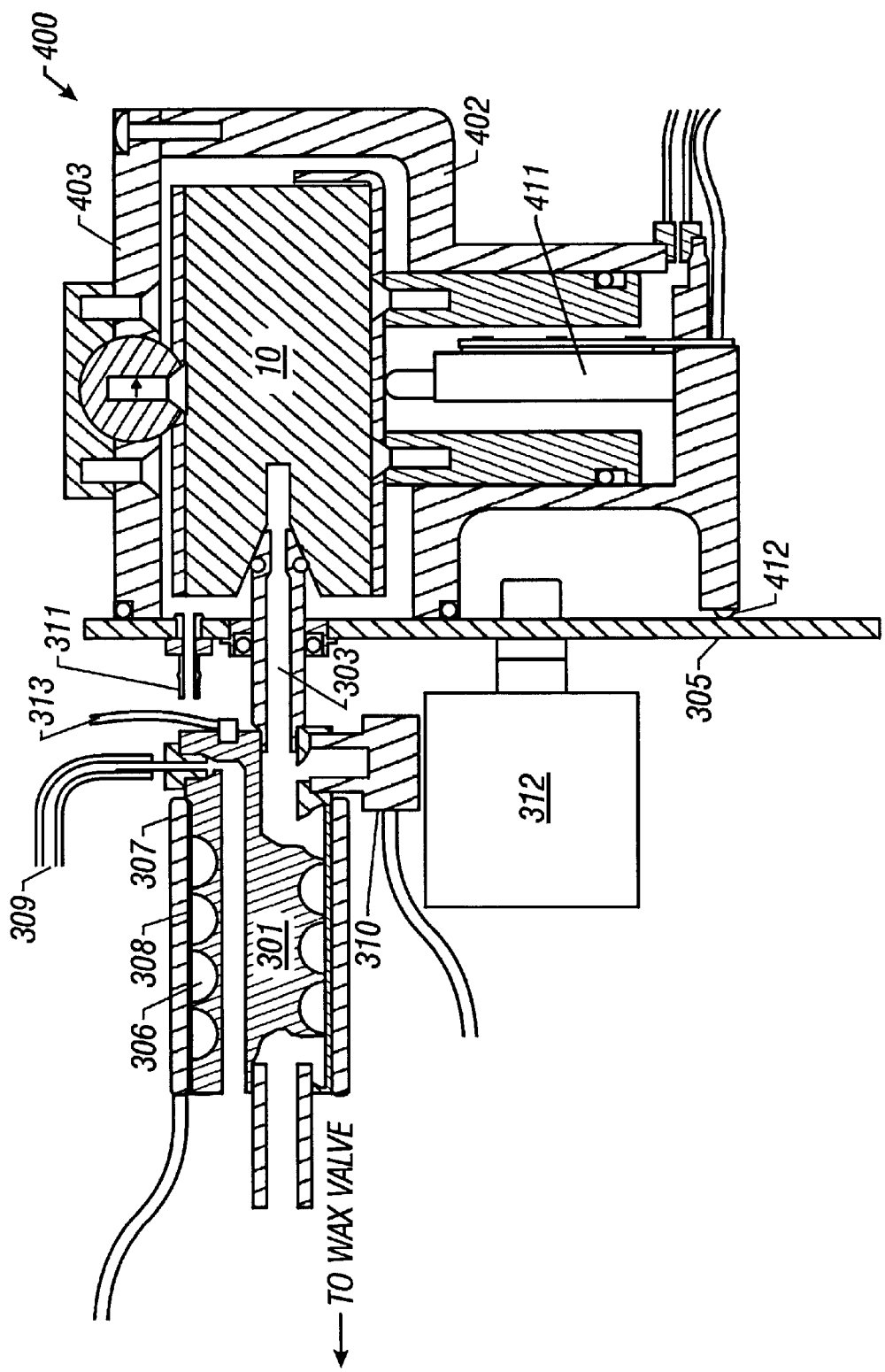
FIG. 6 illustrates the wax injection assembly mated to the vacuum chamber assembly.

Another problem the present invention addresses is air evacuation from within the mold. FIGS. 4 illustrates chamber 400—consisting of chamber/cylinder 402 and chamber lid 403—containing the mold and the mold clamp. An air-tight vacuum chamber is formed when the forward plate 305 is forced by hand against face seal 401 (see FIG. 6). Linear bearing shaft 314 supports forward plate 305. When forward plate 305 simultaneously activates both squaring contacts 412 (FIG. 4a), a vacuum pump (not shown) evacuates the chamber through vacuum connection 311, tightly forcing chamber 400 against forward plate 305. Importantly, nozzle 303 does not engage mold 10 until after chamber 400 is evacuated. This ensures that the mold is evacuated prior to injection. Once the chamber is evacuated, forward cylinder 312 retracts forward plate 305 and chamber 400, inserting nozzle 303 into mold 10.

The vacuum is applied until after the mold is completely filled to ensure that the mold fills properly. Multiple vacuum chambers/clamp assemblies may be used, allowing one mold to cool while another is injected with hot wax.

Mold 10 fits inside the mold clamp, which consists of clamp plate 405 and pivot plate 406. The clamp plate attaches to the top of piston 404. The piston is pneumatically-operated: when the operator depresses clamp mold switch 418 (FIG. 4a), air supplied through line 414 fills cavity 416, forcing piston 404 and clamp plate 405 upward until mold 10 contacts pivot plate 406.

Figure 5:
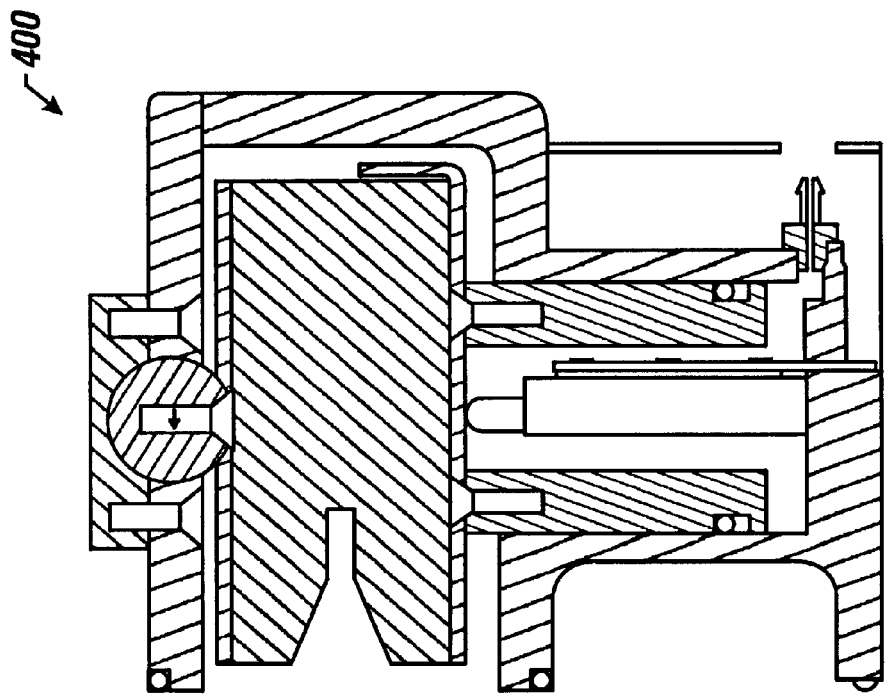
FIG. 5 illustrates the mold clamp accommodating a mold with non-parallel faces.

To accommodate molds whose upper and lower faces are not parallel, ensure uniform clamp pressure, and prevent mold distortion, the present invention utilizes a pivot plate 406, which is attached to spherical pivot ball 407 with screw 408. The pivot ball 407 is free to rotate within the chamber lid 403—which can be made of clear material to aid the operator—and consequently allows the attached pivot plate 406 to "float," or automatically conform to the mold's upper surface regardless of thickness differences across the length of the mold. Pivot cap 409 and screws 410 secure the pivot ball to the chamber lid. FIG. 5 illustrates the mold clamp accommodating a mold of non-uniform thickness.

The mold clamp assembly uses an internal position sensor 411 to accurately measure mold thickness and compression. This information can then be used to compute proper clamp and nozzle seal pressures.

Although preferred embodiments of the present invention have been described in the foregoing Detailed Description and illustrated in the accompanying drawings, the invention is not limited to the embodiments disclosed but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

What is claimed is:

1. An injector that injects wax into a rubber mold, comprising:
    a wax pot that contains a quantity of wax;
    a band heater coupled to the wax pot;
    a wax valve coupled to the wax pot;
    an injection nozzle comprising an integrated heat exchanger, said injection nozzle coupled to said wax valve; and
    a pressure sensor integral to said injection nozzle, wherein the injection nozzle injects wax into the rubber mold.

2. The injector of claim 1 wherein said injection nozzle further comprises a temperature sensor.

3. The injector of claim 1 further comprising:
    a mold clamp that couples the rubber mold to the injector.

4. The injector of claim 4 further comprising:
    a pivoting upper mold clamp plate to accommodate rubber molds with non-uniform thickness.

5. The injector of claim 4 further comprising:
    a vacuum chamber that encloses said mold clamp.

6. The injector of claim 6 further comprising:
    a piston within said vacuum chamber coupled to a lower clamp plate of said mold clamp wherein said lower clamp plate secures said mold within said mold clamp.

7. The injector of claim 5 wherein at least one panel of said vacuum chamber is constructed from a translucent material.

8. The injector of claim 3 wherein said mold clamp further comprises
    an internal position sensor coupled to said mold clamp.

9. The injector of claim 1 further comprising:
    a source of dry high-pressure air coupled to said wax pot that pressurizes said wax pot and drives the wax through said wax injector and into the mold.

10. A system that injects wax into a rubber mold, comprising:
    a wax pot that contains a quantity of wax;
    a band heater coupled to the wax pot;
    a wax valve coupled to the wax pot;
    an injection nozzle comprising an integrated heat exchanger coupled to said wax valve;
    a pressure sensor integral to said injection nozzle;
    a temperature sensor integral to said injection nozzle;
    a mold clamp that couples the rubber mold to the injector;
    a vacuum chamber that encloses said mold clamp;
    a piston within said vacuum chamber coupled to a lower clamp plate of said mold clamp wherein said lower clamp plate secures said rubber mold within said mold clamp;
    an internal position sensor coupled to said mold clamp; and
    a computer that monitors and controls the wax injection pressure and temperature and monitors and controls the piston position.

* * * * *

UNITED STATES PATENT AND TRADEMARK OFFICE
CERTIFICATE OF CORRECTION

PATENT NO. : 6,065,954
DATED : May 23, 2000
INVENTOR(S) : McFerrin

It is certified that error appears in the above-indentified patent and that said Letters Patent is hereby corrected as shown below:

Title page, item [75], inventors: Replace "Joe Lynn Stickland" with -- Joe Lynn Strickland--.

Signed and Sealed this

Tenth Day of April, 2001

*Attest:*

NICHOLAS P. GODICI

*Attesting Officer*  *Acting Director of the United States Patent and Trademark Office*